US012626661B2

(12) United States Patent
Zhou et al.

(10) Patent No.: US 12,626,661 B2
(45) Date of Patent: May 12, 2026

(54) DISPLAY PANEL, DRIVING METHOD THEREOF, AND DISPLAY DEVICE

(71) Applicant: Xiamen Tianma Display Technology Co., Ltd., Xiamen (CN)

(72) Inventors: Lingfeng Zhou, Xiamen (CN); Jingxiong Zhou, Shanghai (CN); Jiaqin Zhang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/937,376

(22) Filed: Nov. 5, 2024

(65) Prior Publication Data

US 2025/0363945 A1 Nov. 27, 2025

(30) Foreign Application Priority Data

May 24, 2024 (CN) ......................... 202410658851.9

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2300/0819* (2013.01); *G09G 2300/0842* (2013.01); *G09G 2300/0861* (2013.01); *G09G 2310/0232* (2013.01); *G09G 2310/08* (2013.01); *G09G 2320/02* (2013.01); *G09G 2320/0233* (2013.01)

(58) Field of Classification Search
CPC ............... G09G 3/3233; G09G 3/2375; G09G 2300/0819; G09G 2300/0842; G09G 2300/0861; G09G 2310/08; G09G 2310/0232; G09G 2320/02; G09G 2320/0233
USPC .......................................................... 345/214
See application file for complete search history.

(56) References Cited

U.S. PATENT DOCUMENTS

2006/0232612 A1* 10/2006 Tsuge .................. G09G 3/3283 345/690
2006/0290611 A1* 12/2006 Tsuge .................. G09G 3/3283 345/74.1
2008/0055216 A1* 3/2008 Yen ...................... G09G 3/3648 345/204
2011/0043493 A1* 2/2011 Chen .................... G09G 3/3685 345/204
2013/0113777 A1* 5/2013 Baek ...................... G09G 5/008 345/212
2020/0051499 A1* 2/2020 Chung ................... G09G 5/377
2020/0074932 A1* 3/2020 Park ...................... G09G 3/3266
2020/0135082 A1* 4/2020 Chen ......................... G09G 3/20
2020/0160781 A1* 5/2020 Park ...................... G09G 3/3275
2021/0158755 A1* 5/2021 Li ......................... G09G 3/3266
2022/0199041 A1* 6/2022 Park ...................... G09G 3/3275
2023/0016947 A1* 1/2023 Kim ...................... G09G 3/3266
2024/0363084 A1* 10/2024 Tian ..................... G09G 3/3648

* cited by examiner

*Primary Examiner* — Tom V Sheng
(74) *Attorney, Agent, or Firm* — Anova Law Group, PLLC

(57) ABSTRACT

A display panel includes a display driving chip and a pixel circuit. The display driving chip is configured to provide a source driving signal for the pixel circuit. The source driving signal comprises a non-display phase of each frame of a display image. The non-display phase includes a first adjustment phase. In the first adjustment phase, the source driving signal output by the display driving chip to the pixel circuit is adjusted to be a target driving signal.

16 Claims, 15 Drawing Sheets

DISPLAY PANEL, DRIVING METHOD THEREOF, AND DISPLAY DEVICE

CROSS-REFERENCE TO RELATED APPLICATION

This application claims priority to Chinese Patent Application No. 202410658851.9, filed on May 24, 2024, the entire content of which is incorporated herein by reference.

TECHNICAL FIELD

The present disclosure relates to the technical field of display control, and in particular to a display panel, a driving method thereof, and a display device.

BACKGROUND

In a product appearance design of a display panel, the display panel is not necessarily a regular shape. Usually, the shape of the display panel has an arc structure, which involves curvature. For example, there are four R-corners (i.e., rounded corners) in a mobile phone screen and a U-corner at a camera position. With the continuous development of display technology, when there is an R-corner structure or a U-corner structure in the display panel, it is necessary to use special algorithms for the R-corner or U-corner based on customer needs to improve the display effect of the panel. Generally, the R-corner black insertion algorithm is used to address related issues. For example, compensating for the sawtooth issue to ensure smooth transitions at the R-corner. Alternatively, compensating for different R-corner curvatures according to different customer needs. However, due to the black insertion algorithm at the R-corner or U-corner, and a lack of algorithmic processing at the straight edge of the screen, there is uneven brightness between the R-corner and the area below the straight edge.

SUMMARY

One aspect of the present disclosure provides a display panel. The display panel includes a display driving chip and a pixel circuit. The display driving chip is configured to provide a source driving signal for the pixel circuit. The source driving signal comprises a non-display phase of each frame of a display image. The non-display phase includes a first adjustment phase. In the first adjustment phase, the source driving signal output by the display driving chip to the pixel circuit is adjusted to be a target driving signal.

Another aspect of the present disclosure provides a display device. The display device includes a display panel. The display panel includes a display driving chip and a pixel circuit. The display driving chip is configured to provide a source driving signal for the pixel circuit. The source driving signal includes a non-display phase of each frame of a display image. The non-display phase includes a first adjustment phase. In the first adjustment phase, the source driving signal output by the display driving chip to the pixel circuit is adjusted to be a target driving signal.

BRIEF DESCRIPTION OF THE DRAWINGS

In order to better convey embodiments of the present disclosure or the technical solutions, a brief introduction will be described below to the drawings that need to be used in the description of embodiments or technical solutions. Obviously, the drawings in the following description are some embodiments of the present disclosure. For those persons of ordinary skill in the art, other drawings can be obtained based on these drawings without exerting any creative effort.

DETAILED DESCRIPTION OF THE EMBODIMENTS

Figure 1:
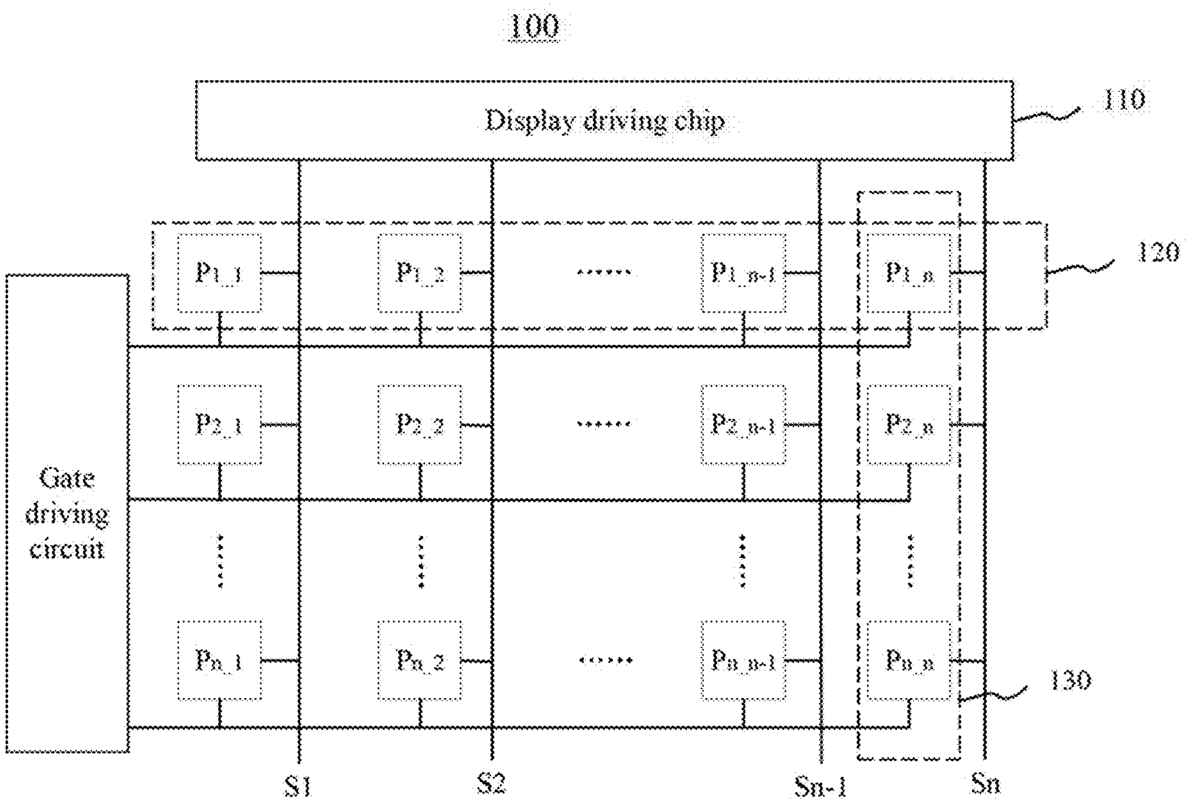
FIG. 1 illustrates a schematic structural diagram of row sub-pixels and column sub-pixels of a display panel according to one embodiment of the present disclosure.

To facilitate the understanding of the present disclosure, the present disclosure will be described thoroughly with reference to relevant drawings. Preferred embodiments of the present disclosure are provided in the drawings. However, the present disclosure can be implemented in many different forms and is not limited to embodiments described here. On the contrary, the purpose of providing these embodiments is to make the understanding of the present disclosure thoroughly and comprehensively.

Unless otherwise defined, all technical and scientific terms used here have same meaning as those commonly understood by those persons of skilled in the art. The terms used here in the specification of the present disclosure are only for the purpose of describing specific embodiments and are not intended to limit the present disclosure.

It should be noted that when an element is referred to as being "fixed to" another element, it may be directly on the other element or there may be an intervening element. When an element is considered to be "connected to" another element, it may be directly connected to the other element or there may be an intervening element at the same time. The terms "vertical", "horizontal", "left", "right" and similar expressions used here are for illustrative purposes only.

In the accompanying drawings, a dimension of a layer and an area may be exaggerated for clarity. It is understood that when a layer or an element is referred to as being "on" another layer or substrate, the layer or element may be directly on another layer or substrate, or there may be an intervening layer. In addition, it is also understood that when a layer is referred to as being "between" two layers, the layer may be the only layer between the two layers, or there may be one or more intervening layers. In addition, a same reference numeral always represents a same element.

In following embodiments, when a layer, an area, or an element is "connected", it can be interpreted that the layer, the area, or the element is not only directly connected but also connected through other constituent elements placed therebetween. For example, when a layer, an area, an element, etc. are described as being connected or electrically connected, the layer, the area, the element, etc. can be connected or electrically connected not only directly or directly, but also through another layer, area, element, etc. in between.

Although terms such as "first", "second", etc. may be used to describe various components, these components are not necessarily limited to the above terms. The above terms are only used to distinguish one component from another. It will also be understood that expressions used in the singular include plural expressions unless the expression in the singular has an obviously different meaning in the context.

When a statement such as "at least one of . . . " is placed before a list of elements, it refers to the entire list of elements rather than an individual element in the list. It should also be understood that the terms "include/comprise" or "have" and the like specify the presence of stated features, integers, steps, operations, components, parts, or combinations thereof. However, it does not exclude the possibility of the presence or addition of one or more other features, integers, steps, operations, components, parts, or combinations thereof.

Electronic or electrical devices and/or any other related devices or components according to embodiments of the present disclosure described here include, for example, a display device having a display panel and a display panel driver, where the display panel driver also includes a drive controller, a gate driver, a gamma reference voltage generator, a data driver, and an emission driver). They can be implemented using any appropriate hardware, firmware (such as a dedicated integrated circuit), software, or a combination of software, firmware, and hardware. For example, various components of these devices may be formed on an integrated circuit (IC) chip or on an independent IC chip. In addition, the various components of these devices may be implemented on a flexible printed circuit film, a tape carrier package (TCP), a printed circuit board (PCB), or formed on a substrate. In addition, the various components of these devices can be operated on one or more processors in one or more computing devices. This can execute a computer program instruction and interact with other system components to execute a process or a thread having various functions described in the present disclosure. A computer program instruction is stored in a memory that can be implemented in a computing device using standard storage devices, e.g., a random-access memory (RAM) that is used in a computing device. The computer program instruction can also be stored in other non-transitory computer-readable media (such as CD-ROM, a flash driver, etc.). Moreover, functions of various computing devices can be combined or integrated into a single computing device, or the functions of a particular computing device can be distributed on one or more other computing devices without departing from the spirit and scope of the concepts of the exemplary embodiments of the present disclosure.

Although exemplary embodiments of a display module and a display device including the display module have been specifically described, many modifications and variations will be apparent to those skilled in the art. Therefore, it will be understood that the display module and the display device including the display module constructed according to principles of the present disclosure may be implemented other than as specifically described in the present disclosure. The present disclosure is also defined in the claims and their equivalents.

Active Matrix Organic Light Emitting Diode (AMOLED) flat panel display screen uses organic materials to make a light-emitting device and uses a thin film transistor (TFT) to build a pixel circuit. Pixels are arranged in an array, and the display panel is refreshed in a row-by-row scanning manner. Sub-pixels 120 in a same row of the display panel 100 shown in FIG. 1 is controlled by a same scanning signal. Sub-pixels 130 in a same column are connected to a same data signal line Sn, and receive a source driving signal provided by a display driving chip on the data signal line Sn to obtain data signal. When the display panel is driven, as shown in the display panel of FIG. 1, by sequentially controlling a scanning signal corresponding to each row to turn on, the source driving signal provided by the display driving chip 110 writes the data signal into the pixel circuit via the data signal line Sn.

As described in the background technology, in the product appearance design of the display panel, the display panel is not necessarily a regular graphic. Usually, the outer shape of the display panel has arc structure(s), which involves curvatures, such as, the four R-corners (rounded corners) of the screen of a mobile phone and/or U-corners at the camera (e.g., rounded corners of a U-shaped area on the screen for accommodating one or more cameras). With the continuous development of display technology, when there is an R-corner structure or a U-corner structure in the display panel, it is necessary to use a special algorithm based on customer needs for the R-corner or U-corner to improve the display effect of the panel. For example, an R-corner black insertion algorithm is used to address related issues, such as compensating for a sawtooth issue to make the R-corner transition smoothly, or compensating for different R-corner curvatures according to different customer needs. Specifically, the R-corner area black insertion is achieved by adjusting the source driving signal and adding a black insertion voltage to the source driving signal.

Figure 2:
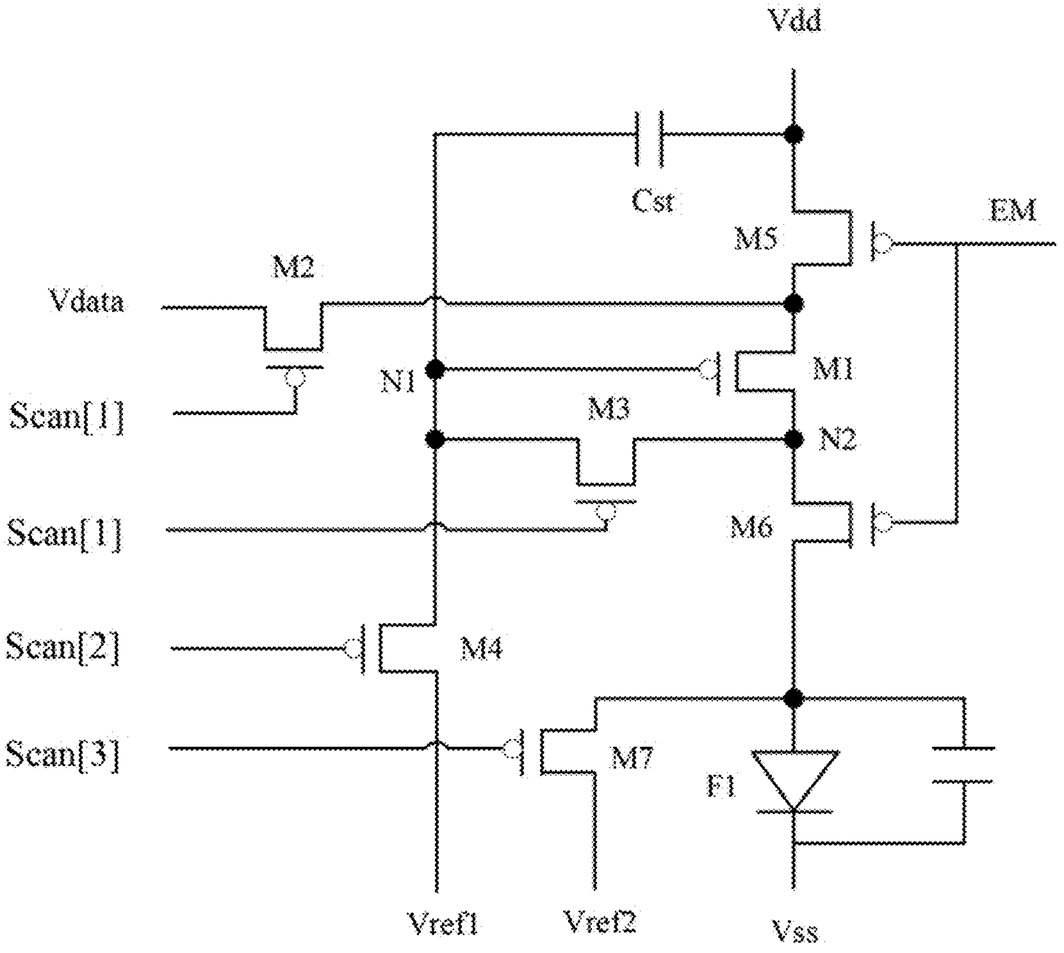
FIG. 2 illustrates a circuit diagram of a 7T1C pixel circuit according to one embodiment of the present disclosure.

For this reason, there is a black insertion algorithm at the R-corner or the U-corner, and the pixel circuit of a sub-pixel at a corresponding position will receive the black insertion voltage. While a straight edge position of the screen is not processed by an algorithm, and sub-pixels at the R-corner area and below the straight edge area have uneven brightness. It should be noted that the pixel circuit in embodiments of the present disclosure can adopt a driving circuit structure such as 2T1C, 3T1C, 4T1C, 5T1C, 6T1C, or 7T1C, and the light-emitting device may include an anode, an organic light-emitting layer, and a cathode. As shown in FIG. 2, taking the 7T1C pixel circuit as an example, the 7T1C pixel circuit includes a driving transistor M1, a storage capacitor Cst, a data writing transistor M2, a threshold compensation transistor M3, a first initialization crystallization M4, a second initialization transistor M7, a first light-emitting control transistor M5, and a second light-emitting control transistor M6. The black insertion algorithm at the R-corner causes N2 of the pixel circuit of the sub-pixel below the R-corner to be subjected to a coupling bias, causing the threshold voltage of the driving transistor to drift negatively and even light up. While the straight edge area has no coupling bias caused by the black insertion algorithm. Thus, the light emission of the pixel below the R-corner is relatively dark.

Figure 3:
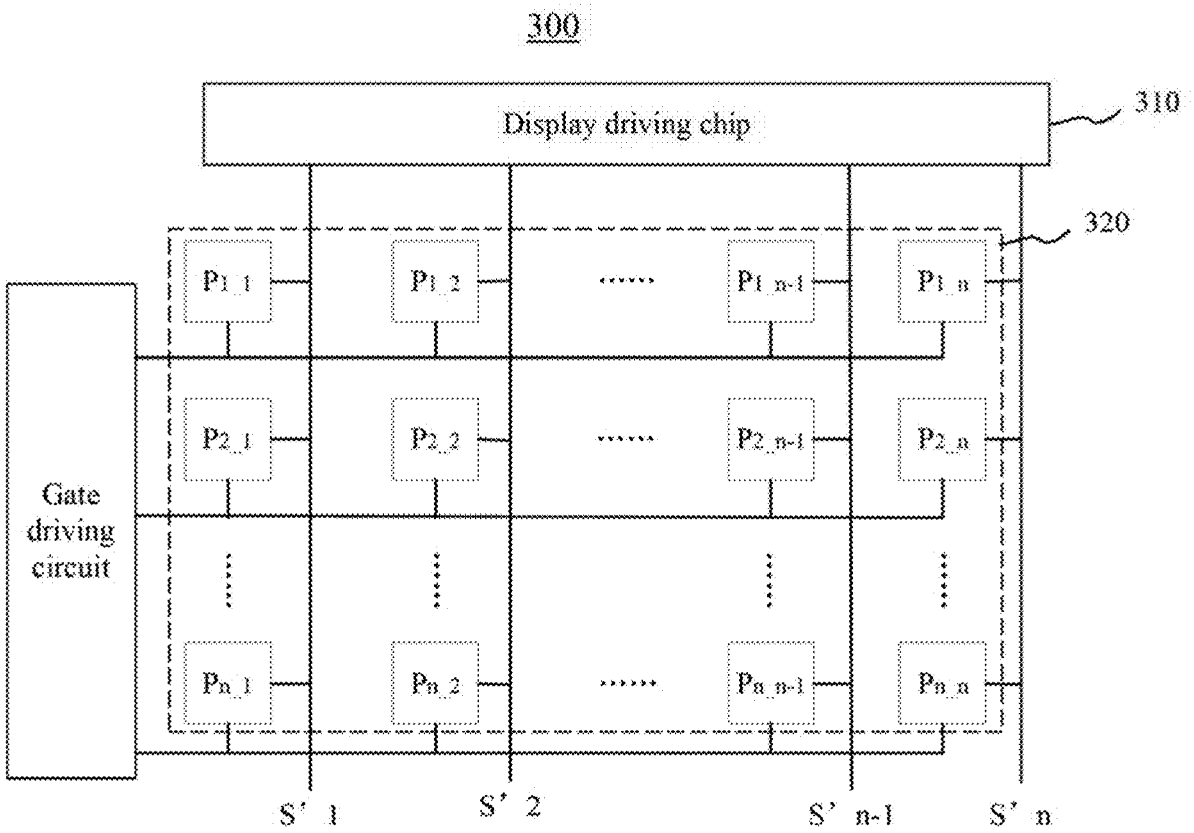
FIG. 3 illustrates a schematic structural diagram of a display panel according to one embodiment of the present disclosure.

Embodiments of the present disclosure provides a display panel. As shown in FIG. 3, the display panel 300 includes a display driving chip 310 and a pixel circuit 320. The display driving chip 310 is used to provide a source driving signal for the pixel circuit 320. The source driving signal includes a non-display phase for each frame of a display image.

The non-display phase includes a first adjustment phase. In the first adjustment phase, the source driving signal output by the display driving chip to the pixel circuit 320 is adjusted to be a target driving signal.

An organic light emitting diode (OLED) display device has many advantages such as self-luminescence, low driving voltage, high luminous efficiency, short response time, high clarity and contrast, nearly 180° viewing angle, wide operating temperature range, flexible display, and large-area full-color display, etc. The OLED display device is recognized by the industry as the display device with the most development potential. OLED is a current-driven device. When current flows through the OLED, the OLED emits light, and the brightness of the light is determined by the current flowing through the OLED itself. The display driving chip 310 is one of the main control components of the display panel 300. The display driving chip 310 sends a driving signal and data to the display panel in a form of electrical signal, and then realizes the control of the screen brightness and color. Thus, the image information can be displayed on the screen.

The display driving chip 310 is composed of a gate driving chip and a source driving chip. The former is used to control the gate switch of the sub-pixel, and the latter is used to adjust the image signal of the sub-pixel to produce a desired color effect. The source driving signal in this embodiment is the data signal provided by the source driving chip in the display driving chip 310 to the pixel circuit of each sub-pixel.

In the field of display technology, a tearing effect is a phenomenon caused by the inconsistent reading and writing speeds of the graphics random access memory (GRAM). When the write pointer (W) overlaps with the read pointer (R), part of the old picture and part of the new picture are displayed on the screen. This phenomenon is called the tearing effect. Ideally, W/R ratio should be greater than ½ to avoid the tearing effect.

The tearing effect (TE) signal is a signal generated by the display driving chip 310 to prevent tearing issues when the image is refreshed during the image display process. When the next frame of the image is ready to be refreshed, the display driving chip 310 generates a TE signal. Optionally, an application processor (AP) sends a next frame of image data to the display driving chip 310 after monitoring the rising edge of the TE signal or detecting that the TE signal is in a high-level state.

Figure 4:
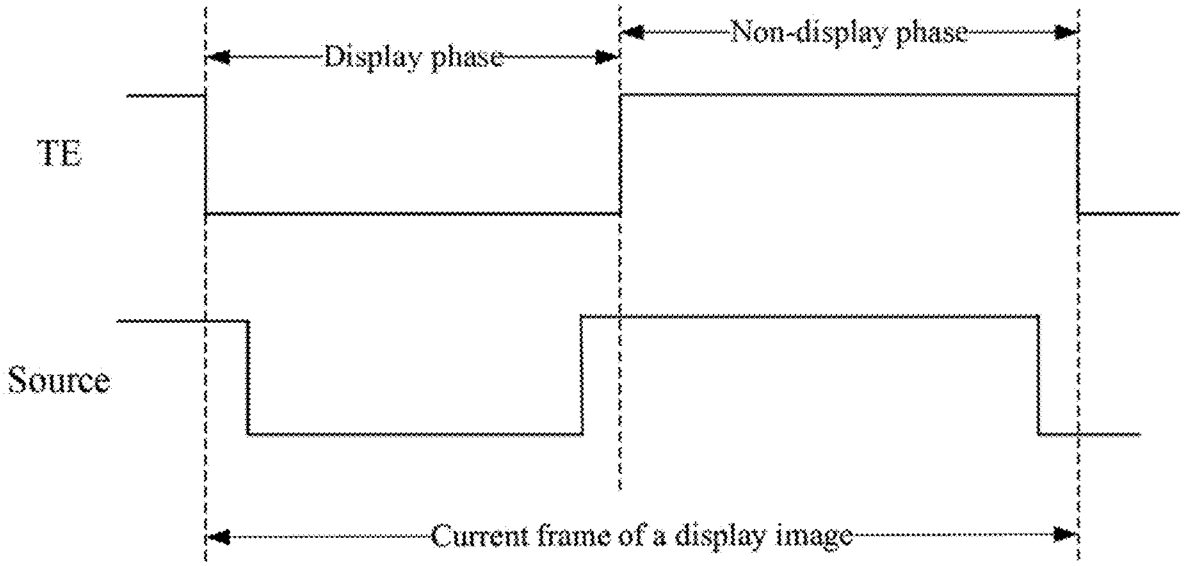
FIG. 4 illustrates a schematic diagram showing a division of a non-display phase according to one embodiment of the present disclosure.

As shown in FIG. 4, during the display panel driving, the entire phase corresponding to each frame of the display image in the source driving signal (Source) is divided into a display phase and a non-display phase through the TE signal. In the display phase, the source driving signal (Source) is transmitted to the pixel circuit through the data signal line, and the pixel circuit refreshes the display according to the received data signal. In the non-display phase, even if the pixel circuit receives the data signal, it will not refresh the display, and still maintain the data signal at the last moment of the display phase for display. It should be noted that the Source signal in FIG. 4 is only used to understand the division of the display phase and the non-display phase of each frame of the display image, and does not limit the Source signal that drives the display panel in practical applications.

Figure 5:
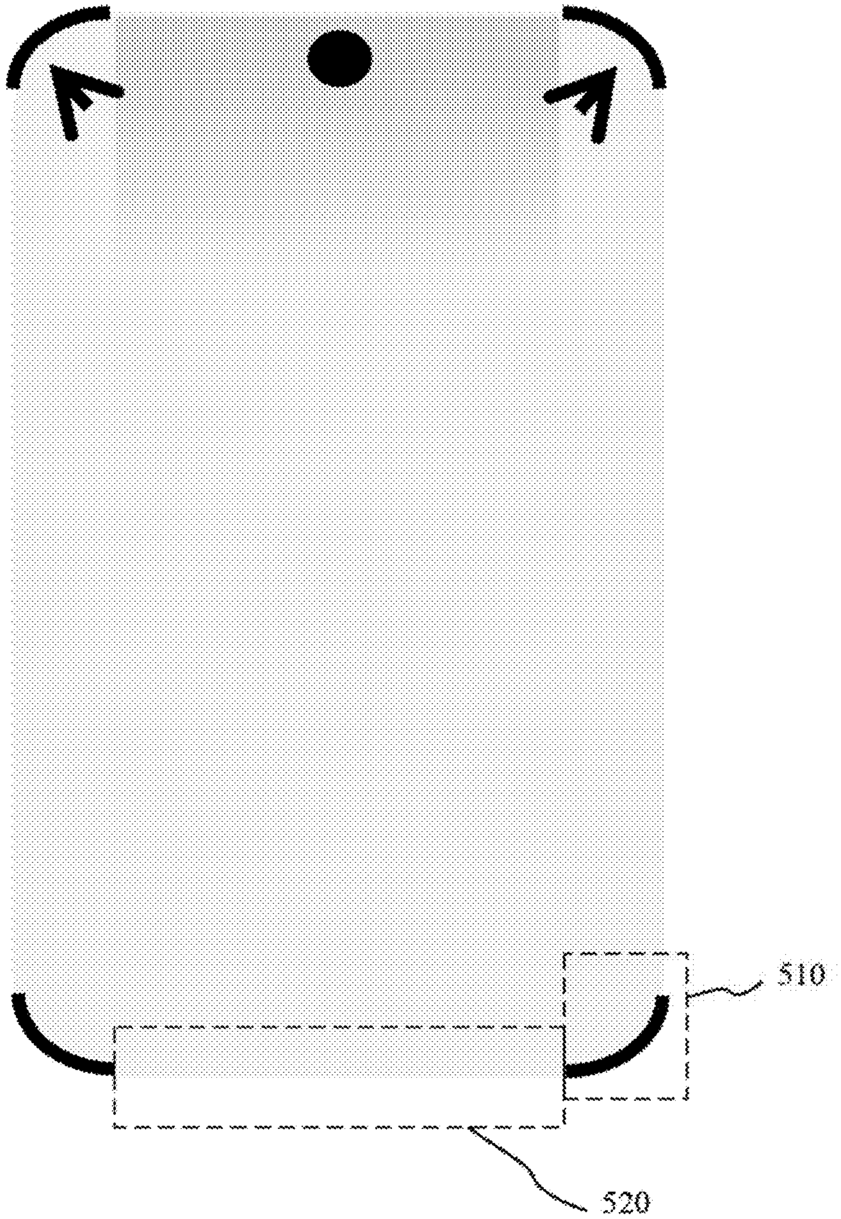
FIG. 5 illustrates a schematic diagram showing positions of R-corner areas and straight edge areas in a display panel according to one embodiment of the present disclosure.

According to the display requirements of the display panel by the customer, in the display phase, a black insertion process will be performed on a specific area in the display panel, such as a sub-pixel in the R-corner area 510 in FIG. 5. Due to an existence of a black insertion algorithm, the pixel circuit of the sub-pixel in the R-corner area 510 will receive a data signal for black insertion, which will bring negative voltage coupling to N2 in the pixel circuit, making the sub-pixel in the R-corner area 510 higher in brightness than the sub-pixel in the straight edge area 520. In order to eliminate the problem of brighter sub-pixel brightness in the R-corner area 510 caused by the black insertion algorithm, in the non-display phase of each frame of the display image, corresponding source driving signals of sub-pixels in the R-corner area 510 and the straight edge area 520 are adjusted so that the source driving signals are target driving signals. Negative voltage couplings of all sub-pixels are all eliminated through the target driving signals.

Therefore, a first adjustment phase is set in the non-display phase of each display image. The source driving signal output by the display driving chip to the pixel circuit is adjusted in the first adjustment phase. The first adjustment phase can be any one period in the non-display phase. The duration of the first adjustment phase is determined according to a potential field of negative voltage coupling caused by the black insertion voltage in the pixel circuit. The number of first adjustment phases can be one or more.

In the display panel provided in an above embodiment, the display driving chip is used to provide a source driving signal for the pixel circuit. The source driving signal includes a non-display phase for each frame of the display image. The non-display phase includes a first adjustment phase. In the first adjustment phase, the source driving signal output by the display driving chip to the pixel circuit is adjusted to a target driving signal. By uniformly adjusting all source driving signals of the display panel in the non-display phase of each frame of the display image, a coupling voltage caused by the black insertion algorithm in all pixel circuits of the display panel is flattened, thereby achieving uniform control of the display brightness of the display panel.

Figure 6:
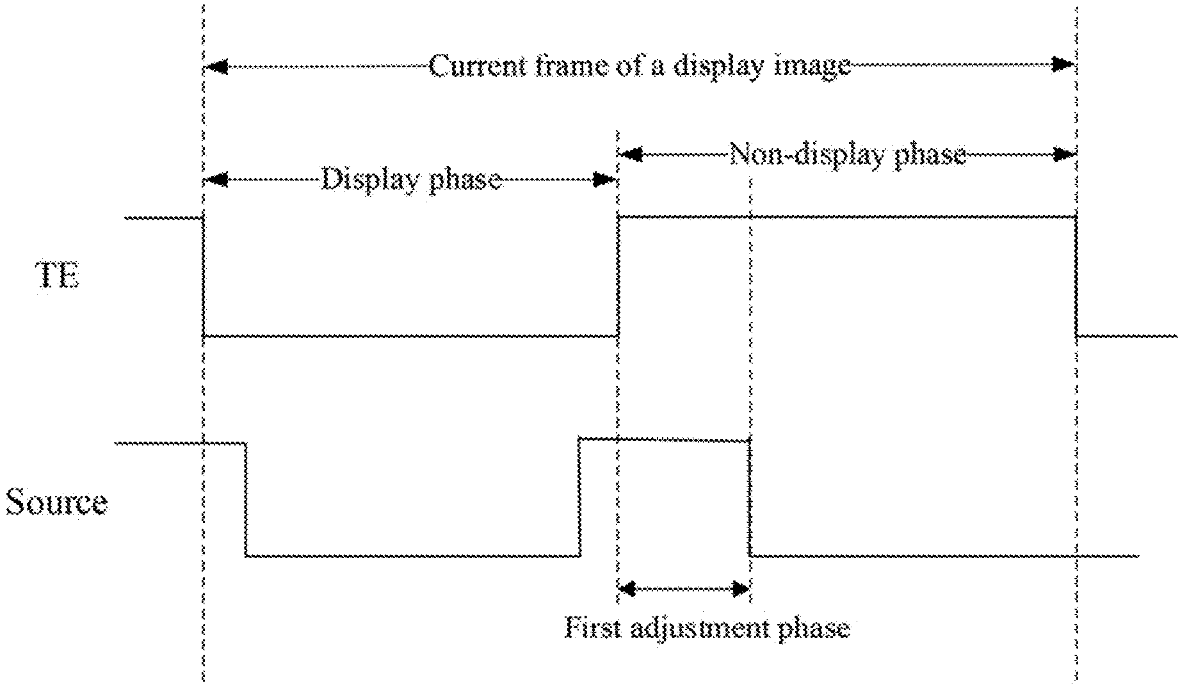
FIG. 6 illustrates a schematic diagram of the start time of the first adjustment phase according to one embodiment of the present disclosure.

In one embodiment, as shown in FIG. 6, a start time of the first adjustment phase coincides with a start time of the non-display phase.

All source driving signals are adjusted to the target driving signal after the non-display phase begins. At that time, for a sub-pixel with the black insertion algorithm at the R-corner, the source driving signal of the column where it is located may not jump. That is, when the black insertion voltage is the same as the voltage value of the target driving signal, the black insertion voltage of the sub-pixel at the R-corner at the end of the display phase is maintained. It is only necessary to adjust the source driving signal corresponding to the straight edge area to the target driving signal to complete an elimination of the coupling voltage.

Figure 7:
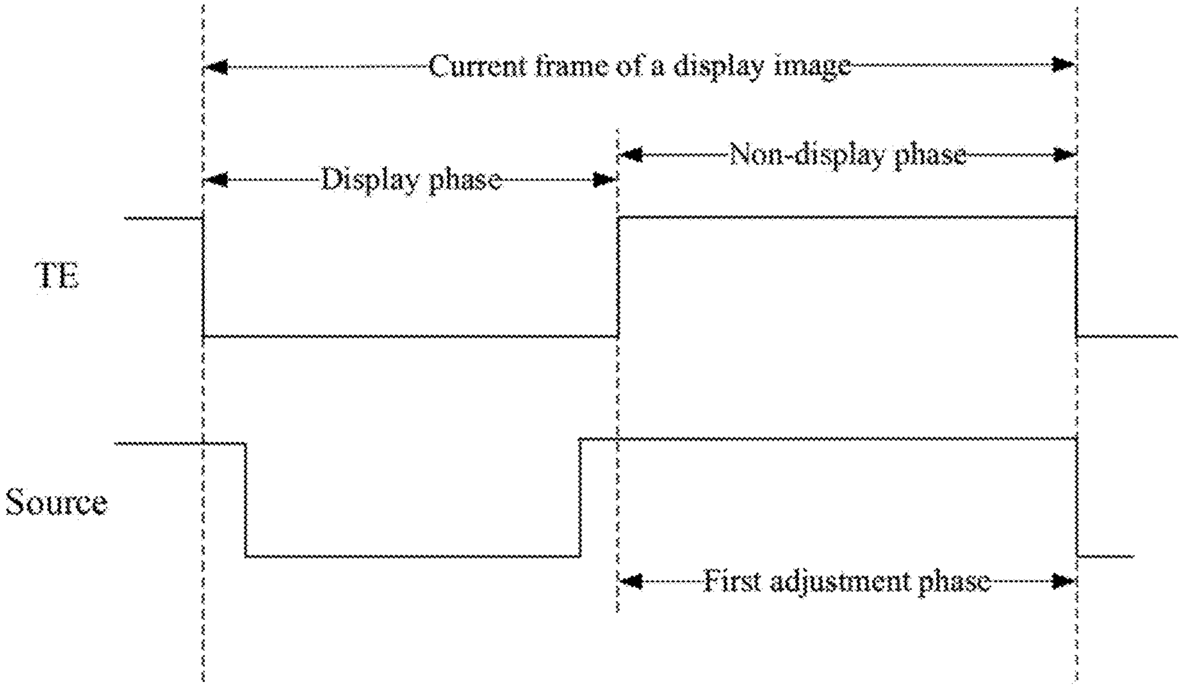
FIG. 7 illustrates a schematic diagram of the end time of the first adjustment phase according to one embodiment of the present disclosure.

In one embodiment, as shown in FIG. 7, an end time of the first adjustment phase coincides with an end time of the non-display phase.

In this embodiment, the entire non-display phase is set as the first adjustment phase, and the source driving signal only needs to be adjusted once, without a second adjustment, thereby reducing the number of adjustments.

Figure 8:
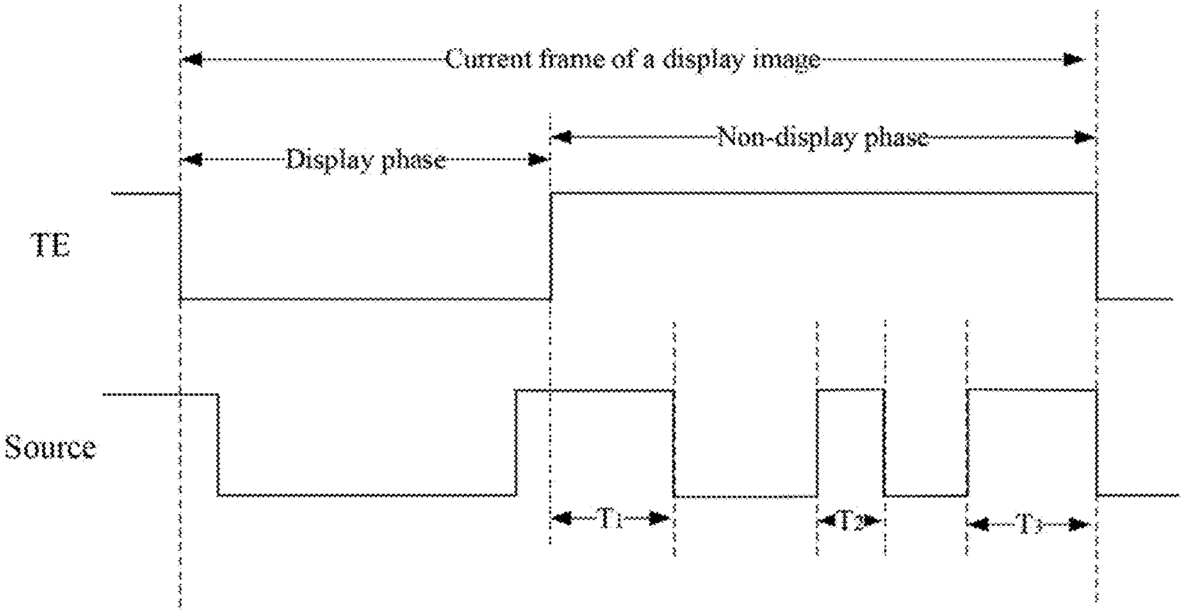
FIG. 8 illustrates a schematic diagram showing dividing the first adjustment phase into N sub-phases according to one embodiment of the present disclosure.

In one embodiment, as shown in FIG. 8, the first adjustment phase includes N sub-phases $T_N$, where N is a positive integer; and the source driving signal includes a jump in at least one sub-phase among the N sub-phases.

The first adjustment phase is divided into a plurality of discontinuous parts through sub-phases, and one or more phases are arbitrarily selected from the N sub-phases of the first adjustment phase to adjust the source driving signal.

In one embodiment, the duration of at least one sub-phase among the N sub-phases is not less than a pre-determined recovery duration and not greater than a duration of the first adjustment phase. The pre-determined recovery duration is a data writing duration of a storage capacitor in a pixel circuit.

The pre-determined recovery duration is the data writing duration of the storage capacitor in the pixel circuit, that is, the potential field in which the data signal in the target driving signal can be written by the storage capacitor in the pixel circuit. The pre-determined recovery duration is used to ensure that the target driving signal, that is, the adjustment of the source driving signal can eliminate the influence of the coupling voltage in sufficient time. At least one of the N sub-phases is used to adjust the source driving signal.

Figure 9:
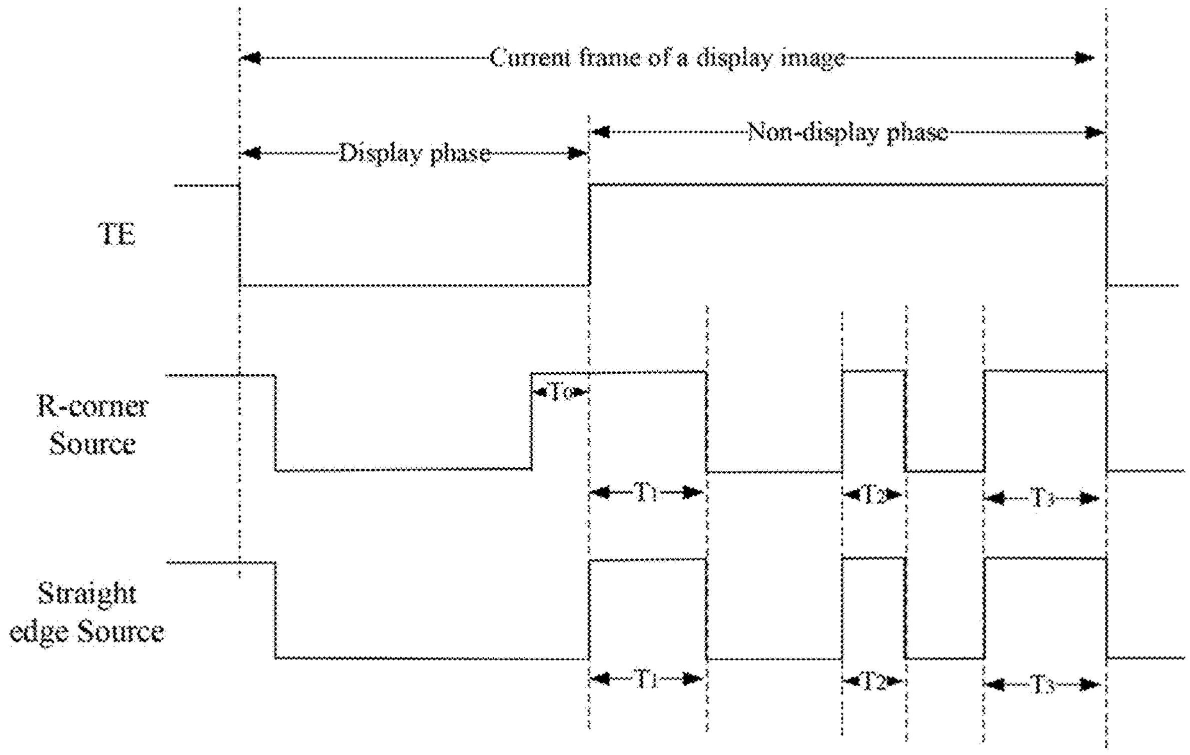
FIG. 9 illustrates a schematic diagram of the start time of the first sub-phase $T_1$ of the first adjustment phase according to one embodiment of the present disclosure.

In one embodiment, as shown in FIG. 9, the source driving signal jumps in the first sub-phase $T_1$ of the N sub-phases, and the start time of the first sub-phase of the N sub-phases is consistent with the start time of the first adjustment phase.

Among them, the first sub-phase $T_1$ is the first sub-phase determined in the N sub-phases of the source driving signal according to the time sequence. The above time sequence refers to the time when the signal is generated or the time when the pixel circuit receives the data signal. From the timing diagram, the first sub-sequence $T_1$ is the leftmost sub-phase in the timing diagram, and the start time of the first sub-phase $T_1$ is consistent with the start time of the first adjustment phase. In this embodiment, the source driving signal is adjusted to the target driving signal at the start time of the first adjustment phase, and the signal is maintained according to the duration of the divided first sub-phase. It should be noted that in the timing diagram shown in FIG. 9, for the R-corner Source, due to the existence of the black insertion algorithm in the $T_0$ phase when the display phase is about to end, it will be different from the straight edge Source. Therefore, the source driving signal in this embodiment jumps in the first sub-phase $T_1$ of the N sub-phases, that is, the source driving signal corresponding to the sub-pixel in the straight edge area is adjusted. The R-corner area does not need to be adjusted when the black insertion voltage is consistent with the voltage of the target driving signal, otherwise it also needs to be adjusted.

In one embodiment, the duration of the first sub-phase of the N sub-phases is equal to the duration of the first adjustment phase.

The duration of the first sub-phase is equal to the duration of the first adjustment phase, which means that after the source driving signal is adjusted to the target driving signal at the start time of the first adjustment phase, the driving signal output of the display panel is always maintained to be the target driving signal during the entire first adjustment phase.

In one embodiment, the source driving signal also includes a display phase of each frame of the display image. The duration of at least one sub-phase among the N sub-phases is not less than the duration of the coupling voltage generated by the pixel circuit in the display phase.

It can be understood that the adjustment of the source driving signal in embodiments of the present disclosure is to eliminate the coupling voltage caused by the black insertion algorithm. Therefore, the duration of at least one sub-phase used to characterize the duration of the target driving signal should not be less than the duration of the coupling voltage generated by the pixel circuit in the display phase.

In one embodiment, the non-display phase further includes a second adjustment phase in addition to the first adjustment phase. In the second adjustment phase, the source driving signal output by the display driving chip to the pixel circuit is adjusted to be a target driving signal.

Figure 10:
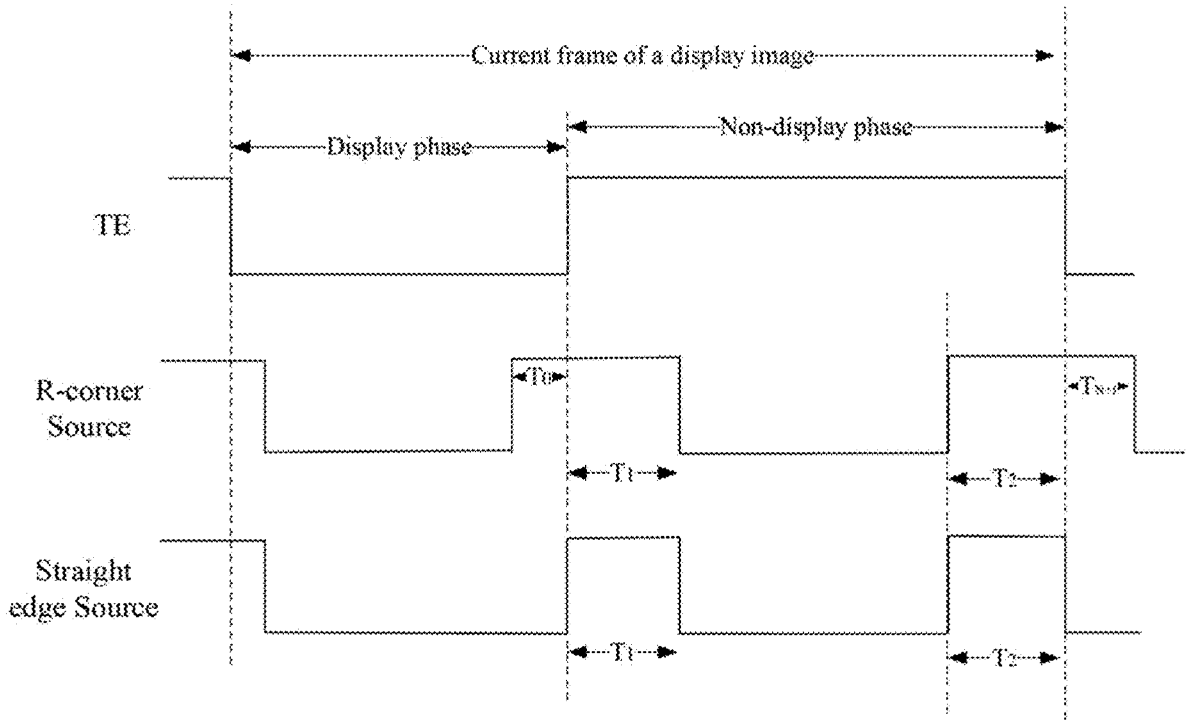
FIG. 10 illustrates a schematic diagram of a black insertion phase according to one embodiment of the present disclosure.

According to the driving principle of the display panel, the display panel uses a row-by-row scanning method to refresh data when it is driven. Therefore, the data of a frame of display image will include the data writing phase corresponding to each row. Therefore, when black insertion is performed on the R-corner, the black insertion algorithm includes not only black insertion for the upper R-corner, but also black insertion for the lower R-corner, as shown in the $T_0$ phase and $T_{N+1}$ phase in FIG. 10. Considering the transmission time of the data signal in the data line, it is necessary to adjust the source driving signal not only in the data writing phase corresponding to the upper R-corner, but also in the data writing phase corresponding to the lower R-corner, as shown in the second adjustment phase in FIG. 7.

In one embodiment, similarly, the duration of the second adjustment phase is not less than the pre-determined recovery duration. The pre-determined recovery duration is the data writing duration of the storage capacitor in the pixel circuit.

Figure 11:
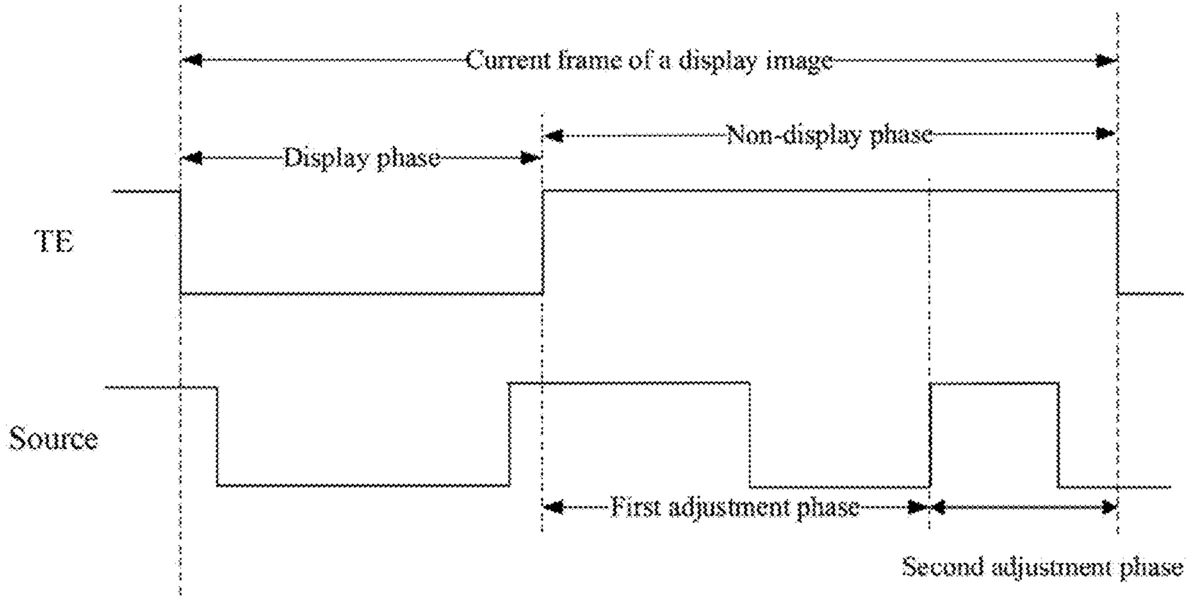
FIG. 11 illustrates a schematic diagram of the start time of the second adjustment phase according to one embodiment of the present disclosure.

In one embodiment, as shown in FIG. 11, the start time of the second adjustment phase coincides with the end time of the first adjustment phase.

In one embodiment, the end time of the second adjustment phase coincides with the end time of the non-display phase.

In one embodiment, the voltage range of the source driving signal after the jump is 5~6V.

In one exemplary embodiment, a display panel is provided. The display panel includes a display driving chip and a pixel circuit. The display driving chip is used to provide a source driving signal for the pixel circuit, and a first adjustment phase (i.e., inserting several rows of dummy data) is set in a non-display phase (blank area) of the source driving signal to achieve black (gray) insertion processing of R-corner area and straight edge area to level the coupling difference.

Figure 12:
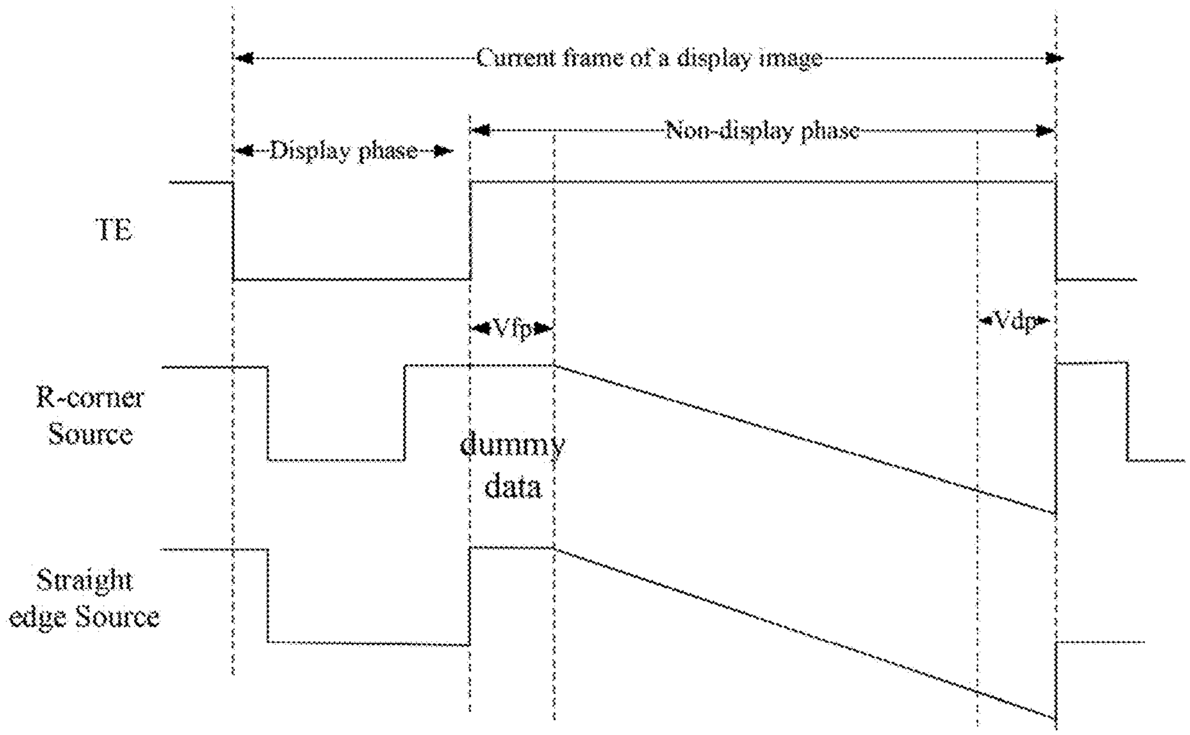
FIG. 12 illustrates a timing diagram of a source driving signal according to one embodiment of the present disclosure.
Figure 13:
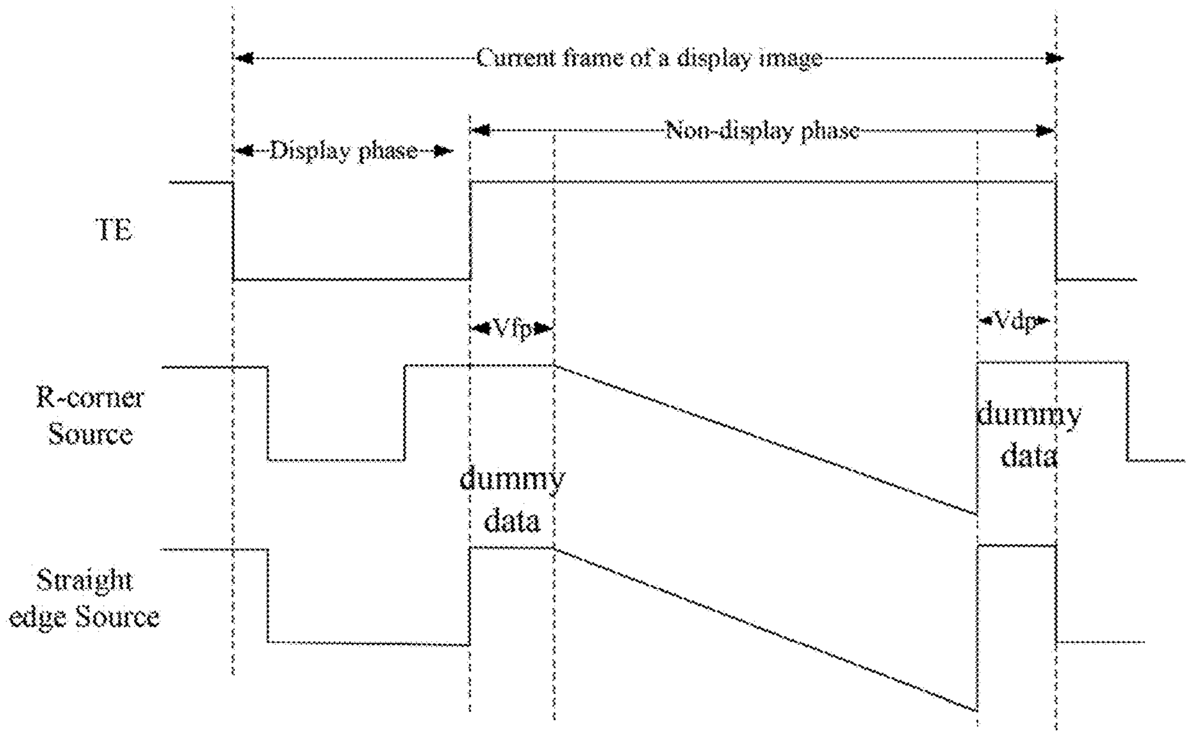
FIG. 13 illustrates a timing diagram of a source driving signal according to another embodiment of the present disclosure.
Figure 14:
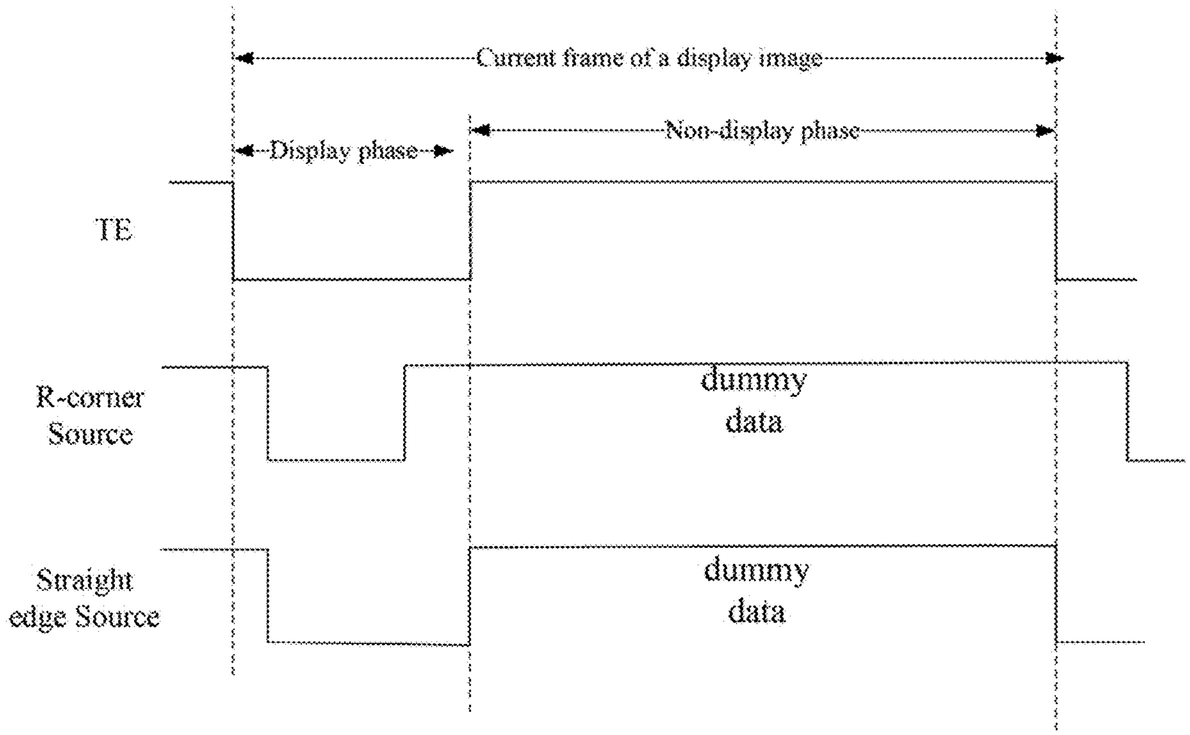
FIG. 14 illustrates a timing diagram of a source driving signal according to another embodiment of the present disclosure.

Specifically, as shown in FIG. 12, several lines of dummy data can be inserted into the leading shoulder Vfp of the frame synchronization signal at the end of the display phase of each frame of the display image. As shown in FIG. 13, several lines of dummy data can be inserted into both the leading shoulder Vfp of the frame synchronization signal and the lagging shoulder Vdp of the frame synchronization signal at the end of the display phase of each frame of the display image. As shown in FIG. 14, the target driving signal can also be maintained during the entire non-display phase of each frame of the display image.

The number of rows inserted into the dummy data is determined according to the existence of coupling voltage and the time length of the pixel circuit of the display panel of receiving the data signal. Usually, the number of rows is greater than or equal to 2. The voltage value of the inserted dummy data is related to a performance parameter of a transistor used in a pre-estimated circuit of the display panel. Usually, the voltage range of the source driving signal after the jump (target driving signal) is 5~6V.

In an above embodiment, several rows of dummy data are inserted into Vfp and/or Vdp at the end of the display phase of each frame of the display image, and the coupling of the R-corner (area) and the straight edge (area) to the TFT is synchronously leveled, which has the advantage of not affecting the pixels and brightness of the display area and having little impact on power consumption. In the non-display phase after the end of the display phase of each frame of the display image, the source driving signal is always kept as dummy data. The coupling of the R-corner and the straight edge to the TFT is synchronously leveled, which has the advantage of not affecting the pixels and brightness of the display area.

Figure 15:
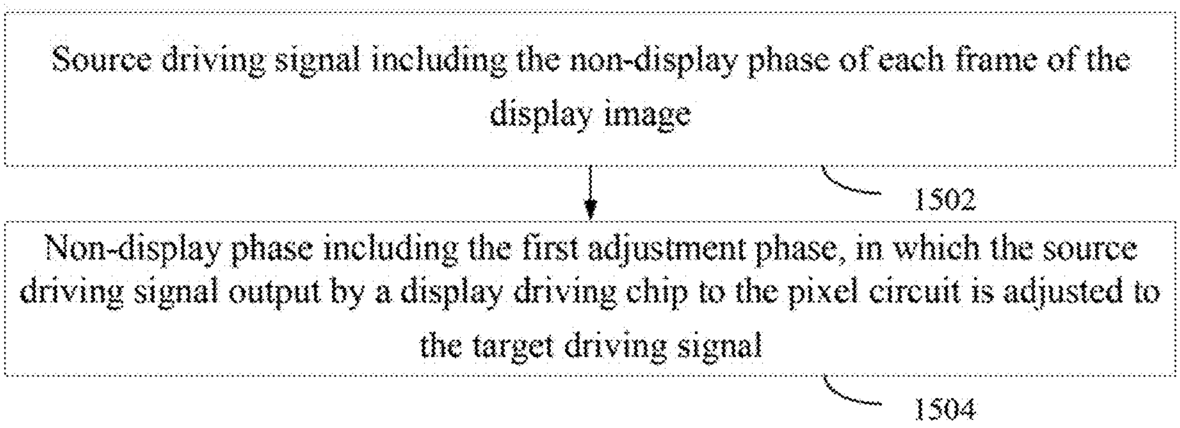
FIG. 15 illustrates a schematic flow chart of a driving method of a display panel according to one embodiment of the present disclosure.

Embodiments of the present disclosure also provide a driving method of the display panel for driving the display panel in an above-mentioned embodiment. The method is applied to a display driving chip of the display panel, as shown in FIG. 15, and includes the following steps.

Step 1502: the source driving signal includes a non-display phase of each frame of the display image.

Step 1504: the non-display phase includes a first adjustment phase. In the first adjustment phase, the source driving signal output by the display driving chip to the pixel circuit is adjusted to be a target driving signal.

In the method provided in an above embodiment, the display driving chip is used to provide a source driving signal for the pixel circuit, and the source driving signal includes a non-display phase of each frame of the display. The non-display phase includes a first adjustment phase. In the first adjustment phase, the source driving signal output by the display driving chip to the pixel circuit is adjusted to a target driving signal. By adjusting all source driving signals of the display panel in the non-display phase of each frame of the display image, the coupling voltage caused by the black insertion algorithm in all pixel circuits of the display panel is flattened, thereby achieving uniform control of the display brightness of the display panel.

Although various steps in a flowchart involved in an above-mentioned embodiment are displayed in sequence according to an indication of arrows, these steps are not necessarily executed in sequence according to the order indicated by the arrows. Unless there is a clear explanation in the present disclosure, the execution of these steps does not have a strict order restriction, and these steps can be executed in other orders. Moreover, at least a part of the steps in the flowcharts involved in the above-mentioned embodiments can include multiple steps or multiple phases. These steps or phases are not necessarily executed at the same time, but can be executed at different times, and the execution order of these steps or phases is not necessarily carried out in sequence, but can be executed in turn or alternately with other steps or at least a part of the steps or phases in other steps.

At least one embodiment of the present disclosure further provides a display device, which includes the display panel described in any one of above embodiments. The display panel is a display assembly for displaying images, and is usually arranged on the front panel of the terminal. The display panel can be designed as a full screen, a curved screen, a special-shaped screen, a double-sided screen, or a foldable screen. The display panel can also be designed as a combination of a full screen and a curved screen, or a combination of a special-shaped screen and a curved screen, which is not limited in this embodiment.

The display device in embodiments of the present disclosure can be an Organic Light-Emitting Diode (OLED) display device, a Quantum Dot Light Emitting Diode (QLED) display device, an electronic paper, a mobile phone, a tablet computer, a television, a monitor, a laptop computer, a digital photo frame, a navigator, a wearable device, an Internet of Things device, or any other products or components with a display function. Embodiments of the present disclosure do not limit them. Optionally, the display device can be an OLED display device, which can be a Low Temperature Poly-Silicon (LTPS) AMOLED display or a Low Temperature Polycrystalline Oxide (LTPO) AMOLED display. The display driving chip is used to drive the display screen to display an image.

In one embodiment, a computer-readable storage medium stores a computer program. When the computer program is executed by a processor, the steps of the driving method of the display panel as described in any one of above embodiments are implemented.

Persons in a relevant field can clearly understand that for the convenience and simplicity of description, exemplary illustrations are performed according to a division of the functional units. In practical applications, the division of the functional units can be completed by different functional units and modules as needed, that is, the internal structure of the device can be divided into different functional units or modules to complete all or part of a function described above. The functional units and modules in some embodiment can be integrated into a processing unit, or each unit can exist physically separately, or two or more units can be integrated into one unit. The integrated unit can be implemented in a form of hardware or in a form of software functional units. In addition, the specific names of the functional units and modules are only for the convenience of distinguishing each other, are not used to limit the scope of protection of the present disclosure. The specific working process of the units and modules in the above-mentioned system can refer to the corresponding process in a method embodiment, which will not be repeated here.

In an above embodiment, the description of each embodiment has its own emphasis. For parts that are not described or recorded in detail in a specific embodiment, reference can be made to the relevant descriptions of other embodiments.

Those persons of skilled in the art will appreciate that the units and algorithm steps of each example described in conjunction with embodiments disclosed here can be implemented in electronic hardware, or a combination of computer software and electronic hardware. Whether these functions are performed in hardware or software depends on the specific application and design constraints of the driving method of the display panel. Those persons of skilled in the art can use different methods to implement the described functions for each specific application, but such implementation should not be considered to be beyond the scope of the present disclosure.

In embodiments of the present disclosure, it should be understood that the disclosed device/user terminal and method can be implemented in other ways. For example, device/user terminal embodiments described above are only illustrative. For example, the division of modules or units is only a logical function division, and there may be other division methods in actual implementation. For example, multiple units or components can be combined or integrated into another system, or some features can be ignored or not executed. Another point is that the mutual coupling or direct coupling or communication connection shown or discussed can be through some interfaces, indirect coupling or communication connection of devices or units, which can be electrical, mechanical, or other forms.

The units described as separate components may or may not be physically separated, and the components displayed as units may or may not be physical units. That is, they may be in one place, or they may be distributed on multiple network units. Some or all the units may be selected according to actual needs to achieve the purpose of the scheme of this embodiment. In addition, each functional unit in each embodiment of the present disclosure may be integrated into a processing unit, or each unit may exist physically separately, or two or more units may be integrated into one unit. The integrated units may be implemented in the form of hardware or in the form of software functional units.

If the integrated module/unit is implemented in a form of a software functional unit and sold or used as an independent product, it can be stored in a computer-readable storage medium. Based on this understanding, the present disclosure implements all or part of a process in an above-mentioned embodiment method, and can also be completed by instructing the relevant hardware through a computer program. The computer program can be stored in a computer-readable storage medium, and the computer program can implement the steps of various method embodiments when executed by the processor. Among them, the computer program includes computer program code, and the computer program code can be in source code form, object code form, executable file, or some intermediate form. The computer-readable medium may include any entity or device capable of carrying computer program code, recording medium, U disk, mobile hard disk, disk, optical disk, computer memory, read-only memory (ROM), random access memory (RAM), electric carrier signal, telecommunication signal, and software distribution medium. It should be noted that the content contained in the computer-readable medium can be appropriately increased or decreased according to the requirements of local legislation and patent practices in the jurisdiction. For example, in some jurisdictions, according to legislation and patent practice, the computer-readable medium does not include electric carrier signals and telecommunication signals.

In the description of specification, the description with reference to the terms "some embodiments", "other embodiments", "ideal embodiments", etc. means that the specific features, structures, materials, or characteristics described in conjunction with the embodiment or example are included in at least one embodiment or example of the present disclosure. In the specification, the schematic descriptions of the above terms do not necessarily refer to a same embodiment or example.

The technical features of above embodiments may be arbitrarily combined. To make the description concise, not all possible combinations of the technical features in the above embodiments are described. However, as long as there is no contradiction in the combination of these technical features, they should be considered to be within the scope of this specification.

The above embodiments only express several implementation methods of the present disclosure, and the descriptions thereof are relatively specific and detailed, but they cannot be understood as limiting the scope of the present disclosure. It should be pointed out that, for persons of ordinary skill in the art, several variations and improvements can be made without departing from the concept of the present disclosure, and these all belong to the protection scope of the present disclosure. Therefore, the protection scope of the present disclosure shall be subject to the attached claims.

What is claimed is:

1. A display panel, comprising a display driving chip and a pixel circuit, wherein the display panel includes a specific display area and a straight edge display area;

the display driving chip is configured to provide a source driving signal for the pixel circuit; and the source driving signal comprises a non-display phase of each frame of a display image; and the non-display phase comprises a first adjustment phase; in the first adjustment phase, the source driving signal output by the display driving chip to the pixel circuit is adjusted to become a target driving signal for compensating negative voltage coupling caused by black insertion performed on the specific display area.

2. The display panel according to claim 1, wherein a start time of the first adjustment phase is consistent with a start time of the non-display phase.

3. The display panel according to claim 2, wherein an end time of the first adjustment phase is consistent with an end time of the non-display phase.

4. The display panel according to claim 1, wherein the first adjustment phase comprises N sub-phases; N is a positive integer; and the source driving signal comprises a jump in at least one sub-phase of the N sub-phases.

5. The display panel according to claim 4, wherein a duration of at least one sub-phase of the N sub-phases is not less than a pre-determined recovery duration and not greater than a duration of the first adjustment phase; and the pre-determined recovery duration is a data writing duration of a storage capacitor in the pixel circuit.

6. The display panel according to claim 5, wherein the source driving signal jumps in a first sub-phase of the N sub-phases; and a start time of the first sub-phase of the N sub-phases is consistent with a start time of the first adjustment phase.

7. The display panel according to claim 6, wherein a duration of the first sub-phase of the N sub-phases is equal to the duration of the first adjustment phase.

8. The display panel according to claim 4, wherein the source driving signal further comprises a display phase of each frame of the display image; a duration of at least one sub-phase of the N sub-phases is not less than a duration of a coupling voltage generated by the pixel circuit in the display phase.

9. The display panel according to claim 1, wherein the non-display phase further comprises a second adjustment phase in addition to the first adjustment phase; and in the second adjustment phase, the source driving signal output by the display driving chip to the pixel circuit is adjusted to be the target driving signal.

10. The display panel according to claim 9, wherein a duration of the second adjustment phase is not less than a pre-determined recovery duration; and the pre-determined recovery duration is a data writing duration of a storage capacitor in the pixel circuit.

11. The display panel according to claim 9, wherein a start time of the second adjustment phase is consistent with an end time of the first adjustment phase.

12. The display panel according to claim 11, wherein an end time of the second adjustment phase is consistent with an end time of the non-display phase.

13. The display panel according to claim 1, wherein a voltage range of the source driving signal after a jump is 5-6V.

14. A driving method of a display panel, wherein the driving method is applied to the display panel according to claim 1; and the driving method comprises:

the source driving signal, comprising the non-display phase of each frame of the display image; and the non-display phase, comprising the first adjustment phase; and in the first adjustment phase, the source driving signal output by a display driving chip to the pixel circuit is adjusted to the target driving signal.

15. A non-transitory computer-readable storage medium, containing a computer program that, when being executed, causes at least one processor to perform the driving method according to claim 14.

16. A display device, comprising a display panel, wherein the display panel includes a specific display area and a straight edge display area;

the display panel comprises a display driving chip and a pixel circuit;

the display driving chip is configured to provide a source driving signal for the pixel circuit; and the source driving signal comprises a non-display phase of each frame of a display image; and the non-display phase comprises a first adjustment phase; in the first adjustment phase, the source driving signal output by the display driving chip to the pixel circuit is adjusted to become a target driving signal for compensating negative voltage coupling caused by black insertion performed on the specific display area.

* * * * *